Dec. 24, 1935.  J. W. VAN METER  2,025,365
INSECTICIDAL AND FUNGICIDAL AGENT AND METHOD
Filed July 27, 1934
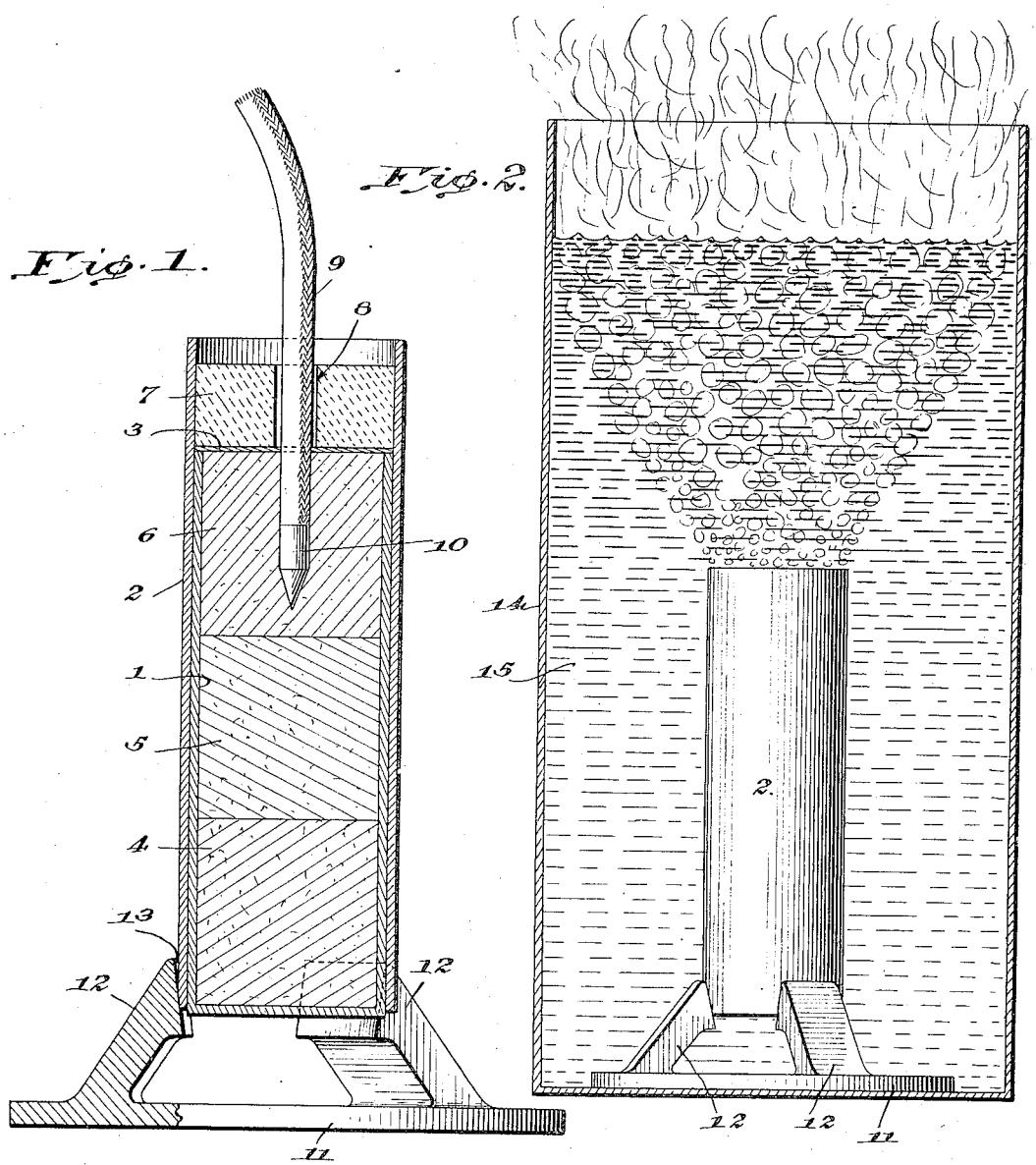
INVENTOR
James W. Van Meter Patented Dec. 24, 1935

2,025,365

UNITED STATES PATENT OFFICE 2,025,365

INSECTICIDAL AND FUNGICIDAL AGENT AND METHOD

James W. Van Meter, Los Angeles, Calif., assignor of one-half to G. Edward Fetters, Los Angeles, Calif.

Application July 27, 1934, Serial No. 737,297

5 Claims. (Cl. 167—14)

This invention relates to a new and improved insecticide and fungicide and to a process for the preparation of the same.

I have found that if elemental sulphur and antimony each in powdered state in juxtaposition one to another and immersed in a suitable absorbent liquid, such as water, kerosene or other oil, be suddenly raised to a high temperature such as would be imparted by the ignition of a metallic aluminum—ferric oxide mixture, i. e., thermit, violent reactions are thereby induced giving rise to products which are absorbed in the enclosing liquid, thus forming a solution of marked insecticidal and fungicidal properties.

Reference is here made to the accompanying drawing which shows a preferred means for obtaining the above-described insecticidal and fungicidal solution. This means will be seen to be in the general nature of a cartridge. The cartridge or container itself consists preferably of heavy paper, preferably lined with silicate of soda. Into this container successive layers of flowers of sulphur, powdered antimony and a reactive metallic aluminum and ferric oxide mixture, in equal volumes, are introduced, each occupying approximately one-fourth of the cartridge. The upper fourth of the cartridge is composed of a clay disc provided with an aperture to accommodate a fuse. A fuse of sufficient length is supplied, passing downwardly through said aperture in the clay disc provided for the purpose, and communicating with a metallic magnesium priming within the body of the thermit.

In practice the fuse is ignited and the cartridge then dropped into the absorbent liquid, e. g., an oil such as kerosene, or other suitable liquid absorbent. A violent reaction is thus induced, by the heat produced by the reaction taking place in the thermit mixture, and gases are evolved and absorbed in the retaining liquid.

Illustrating the invention, I may say that a cartridge containing 3 ounces of flowers of sulphur, 3 ounces of antimony and 3 ounces of thermit mixture, when ignited and dropped into a vessel containing 10 gallons of water, gives a solution having the requisites for combating leaf hopper, aphis, thrip and other pests, as well as fungi.

I have found that to the solution obtained as above described, may be added nicotine, nicotine sulphate, oils, aniline, aniline products and other substances having insecticidal and/or fungicidal properties, without injuring the nicotine sulphate or other added agents.

Instead of antimony in the above composition I may use another metallic element such as zinc, arsenic, lead or other metals.

In the drawing,

Fig. 1 is a cross sectional view of a cartridge constituting the preferred means for preparing the solution of the present invention, and Fig. 2 is a schematic representation of such cartridge in use.

Reference numeral 1 represents a vessel fabricated from the strong paper and impregnated and/or coated with silicate of soda. 2 represents an outer shell, also of strong paper, adapted to tightly fit over the outside of vessel 1. 3 is a covering, which may be of paper, for the top of vessel 1. 4 represents a mass of flowers of sulphur occupying the bottom of vessel 1; 5 represents a like volume of powdered antimony (or other operable metal); and 6 represents a mass of thermit mixture (i. e., a mixture, in proper proportions and distribution, of powdered metallic aluminum and powdered ferric oxide). 7 represents a clay disc tightly fitting the shell 2 adjacent the top thereof, said disc being provided with an opening 8 therethrough for the free passage of a fuse 9. 10 represents a conventional magnesium primer connected to said fuse 9.

For inducing the cartridge to maintain an upright position when dropped into a body of liquid, I employ a weighted base 11 having a plurality of (e. g., three) upwardly and inwardly extending arms 12, 12, provided with sloping detent surfaces 13 against which the base of the cartridge may be pressed for a tight fit.

14 represents any suitable vessel holding a body of absorbent liquid (e. g. water) 15. Fig. 2 represents the desired location of the ignited cartridge after having been dropped into liquid 15.

To prepare the cartridge, I place substantially equal amounts by weight of flowers of sulphur, powdered antimony and thermit mixture, in the order named, in vessel 1, the amounts being so proportioned with respect to the size of the vessel as to fill or substantially fill the latter. Over the top of vessel 1 I place a paper covering, and over this I force the outer shell 2 containing the clay disc above described. When the cartridge is to be used, I place it rigidly in a weighted base, as shown, insert the primer end of a fuse through opening 8 in the disc, and force the fuse through the paper covering and into the mass of thermit mixture therebeneath. I then ignite the fuse, and thereafter drop the cartridge into the body of absorbing liquid (e. g., water).

The reaction may, with success, be induced within a body of absorbing liquid which latter is confined in a closed container, whereby absorption of gases may be effected under pressure.

I claim:

1. The process of preparing an insecticidal and fungicidal solution which comprises inducing a high temperature reaction between elemental sulphur and elemental antimony, while said reactants are contained in a container which is immersed in a body of absorbing liquid.

2. An insecticidal and fungicidal solution, obtained by the process which comprises inducing a high temperature reaction between elemental sulphur and elemental antimony while said reactants are contained in a container which is immersed in a body of an absorbing liquid.

3. The process of preparing insecticide and fungicide solutions which comprises the inducing of reactions within the body of liquids by immersing the reactive agents in an absorbent liquid and while thus immersed locally generating the heat requisite to promote the desired reaction.

4. The process of preparing insecticide and fungicide solutions which comprises the inducing of reactions within the body of liquids by immersing the reactive agent in water and while thus immersed locally generating the heat requisite to promote the desired reaction.

5. The process of preparing insecticide and fungicide solutions which comprises the inducing of reactions within the body of liquids by immersing the reactive agents in oil and while thus immersed locally generating the heat requisite to promote the desired reaction.

JAMES W. VAN METER.